United States Patent
Gilby

(10) Patent No.: US 7,795,570 B2
(45) Date of Patent: Sep. 14, 2010

(54) SELF-SCANNED PHOTODIODE ARRAY WITH SELECTIVELY-SKIPPED PIXELS

(75) Inventor: Anthony C. Gilby, Foxborough, MA (US)

(73) Assignee: Waters Technologies Corporation, Milford, MA (US)

(*) Notice: Subject to any disclaimer, the term of this patent is extended or adjusted under 35 U.S.C. 154(b) by 769 days.

(21) Appl. No.: 10/598,614

(22) Filed: Mar. 30, 2007

(65) Prior Publication Data

US 2008/0018756 A1   Jan. 24, 2008

Related U.S. Application Data

(60) Provisional application No. 60/552,056, filed on Mar. 10, 2004.

(51) Int. Cl.
*H04N 5/335* (2006.01)
(52) U.S. Cl. ............... 250/208.1; 348/302; 348/362
(58) Field of Classification Search ........... 250/208.1; 348/302, 362
See application file for complete search history.

(56) References Cited

U.S. PATENT DOCUMENTS

| 5,892,541 | A | 4/1999 | Merrill |
| 6,175,383 | B1 | 1/2001 | Yadid-Pecht |
| 6,452,633 | B1* | 9/2002 | Merrill et al. ............... 348/302 |
| 6,529,241 | B1* | 3/2003 | Clark ....................... 250/208.1 |
| 6,606,121 | B1* | 8/2003 | Bohm et al. ................. 348/297 |
| 6,665,010 | B1* | 12/2003 | Morris et al. ............... 348/297 |
| 6,765,619 | B1 | 7/2004 | Deng et al. |
| 2002/0027606 | A1 | 3/2002 | Yadid-Pecht |

* cited by examiner

*Primary Examiner*—Seung C Sohn
(74) *Attorney, Agent, or Firm*—Anthony J. Janiuk; Siqun Huang

(57) ABSTRACT

A self scanning photodiode array allows low signal pixels to accumulate charge for multiples of predetermined exposure time $t_0$ before being read. The pattern of exposures, the integers $M_i$ where I runs from 1 to N the number of pixels in the array, is chosen such that the pixels of interest accumulate as much charge as possible without exceeding saturation.

13 Claims, 5 Drawing Sheets

SELF-SCANNED PHOTODIODE ARRAY WITH SELECTIVELY-SKIPPED PIXELS

CROSS REFERENCE RELATED APPLICATION INFORMATION

This application claims priority from U.S. Provisional Patent Application No. 60/552,056, filed Mar. 10, 2004. The contents of these applications are incorporated herein by reference.

FIELD OF THE INVENTION

This invention relates to spectro-photometers adapted to be used as a multi-purpose spectro-photometer or a detector for analysis. In particular, this invention relates to an improvement in the signal-to-noise ratio of measurements made using a self-scanned photodiode array to detect light in the UV, visible and IR portions of the spectrum.

BACKGROUND OF THE INVENTION

In the application described here, light containing a range of wavelengths is dispersed and focused onto a photodiode array so that the output of the array is the spectrum. Typically the amount of light varies strongly with wavelength so that the pixels of the array generate photo charge at widely disparate rates.

A scan of the array is also made with the light blocked by a shutter to determine the dark current contribution and any offset due to the amplifying electronics. These dark values are subtracted to produce N digital values which measure the photo charge accumulated on each of the N pixels in time $t_0$. A number of such scans are normally co-added so that an averaged set of dark-corrected pixel signals is created at some predetermined sample interval, or sample time.

Assuming that the light intensity falling on the diode array does not fluctuate, there are two sources of noise which degrade the precision of measuring the charge accumulated on each pixel. First there is shot noise, proportional to the square root of the accumulated charge. This is an unavoidable consequence of the discrete nature of electron flow. If this were the only noise source, the signal-to-noise ratio would improve as the square root of the amount of charge accumulated each time a pixel is read, and also as the square root of the number of times the pixel is read. Therefore, the signal-to-noise ratio would not depend on the exposure time $t_0$, only on the rate of charge generation by the light. However, the second source of noise, so-called fixed noise, is independent of the light intensity, and corrupts the signal every time the pixel charge is read. It has two components: read noise, otherwise known as kTC noise, originating in the PDA device, and noise from the external amplifier. There is also a shot noise contribution from the pixel dark current, but at the relatively high light levels considered here it can be ignored.

If the light signal is high enough, shot noise dominates, which is proportional to the square root of the signal. But if the signal falls, the fixed noise dominates the signal-to-noise ratio, which now degrades in direct proportion to the falling signal.

In prior art methods it is standard practice to select the longest time period possible for $t_0$ with the condition that none of the pixels saturate within the spectral range of interest for a particular experiment or series of measurements. The exposure time $t_0$ is established by measuring the full spectrum with a reference material in the sample cell, using a short exposure time where it is known that no pixels will saturate. The exposure time $t_0$ is then found by scaling the short exposure time so that the highest-signal pixel within the spectral range of interest will be, for example, 85% of saturation.

In the case of HPLC detection, the reference material is mobile phase at the start of a separation when no absorbing sample is present. Selecting $t_0$ as long as possible minimizes the number of reads of the array within the sample time, thereby minimizing the effect of read noise added to the pixel signals. Pixels outside the spectral range of interest may saturate. The self-scanning process reads all of the pixels in the array at intervals of $t_0$, and the values for those pixels outside the range of interest are simply ignored. Some of those pixels may saturate, but this does not affect data from pixels within the desired spectral range.

To optimize data collection and signal-to-noise ratio, exposure time $t_0$ must be a sub-multiple of the sample time, which is the reciprocal of the data rate (i.e. the number of times per second the pixel values are reported). This condition assures that data collection is continuous, with no waiting periods when measurement time is lost.

Prior art approaches select the best exposure time $t_0$ for the pixels with the highest signals, and the signal-to-noise ratio is optimized for these pixels. However other pixels in the array may receive much lower amounts of light and accumulate charge at a much lower rate. These pixels are read out with a large signal-to-noise disadvantage since the fixed noise associated with each read is constant, while the accumulated charge signal is low.

SUMMARY OF INVENTION

The inventive method and apparatus improve the signal-to-noise ratio of measurements made using a self-scanned photodiode array to detect light in the UV, visible and IR portions of the spectrum. According to the invention, a linear array of N pixels receives light creating electrons and holes in the pixel junction region. Charge is accumulated in the pixel and associated capacitor at a rate proportional to the light intensity and quantum efficiency of the photodiode. In prior art devices, after an exposure time $t_0$, the self-scanning process is initiated and the charge residing in each pixel is switched sequentially onto the output video line. Each charge packet is amplified, passed to a sample-and-hold circuit, converted to a digital value and passed to a data system.

Advantageously, the inventive method allows low signal pixels to accumulate charge for multiples of the exposure time $t_0$ before being read. For example, the ith pixel is exposed for $M_i$ read cycles, or a time of $M_i t_0$. This is accomplished by disabling or skipping the read signal to the ith pixel for $(M_i-1)$ read cycles, reading it every $M_i$th scan of the array. The pattern of exposures, the integers $M_i$ where i runs from 1 to N the number of pixels in the array, is chosen such that the pixels of interest accumulate as much charge as possible without exceeding, for example, 85% of saturation.

In order to report data from the array at a chosen sample rate (for example 10 points or spectral scans per second), permitted exposure values $M_i t_0$ are restricted to sub-multiples of the sample interval, in this case 100 ms. In a first illustrative embodiment, if $t_0$ were set at 12.5 ms, permitted values for the integers Mi would be 1, 2, 4 and 8, yielding pixel exposures of 12.5 ms, 25 ms, 50 ms and 100 ms.

It is contemplated within the scope of the invention that more exposure choices are possible if the self-scanning clock speed is higher than needed for the shortest exposure $t_0$, or if the sample interval is longer. In a second illustrative embodiment, if it is desired to obtain a reading of the array once every 300 ms and the clock speed allows the array to be scanned every 6.25 ms, then permitted exposures in ms are: 6.25, 12.5, 18.75, 25, 37.5, 50, 75, 100, 150, 300, with corresponding values $M_i$ of: 1, 2, 3, 4, 6, 8, 12, 16, 24, 48.

It may be that the shortest exposure used for any pixel is still 12.5 ms, and the longest 100 ms, but a change to the clock speed allows 7 exposure choices versus 4 for the first example. More choice means overall better signal-to-noise optimization of the individual pixel exposure times $M_i t_0$.

As noted above in discussing prior art devices, the dark signal made with a shutter closed is subtracted from each pixel signal to determine the digital value attributable to the light falling on that pixel. In the case of the present embodiment, the dark signal must of course be measured using the same exposure pattern of integers $M_i$.

When the self scanned array according to an embodiment of the present invention is read, N charge packets are measured every scan. Those relating to skipped pixel reads have a value which is nominally zero. However they are not exactly zero because read noise and amplifier noise are present. The data system sets these values to zero exactly, so that when values from the several scans of the array are co-added and the spectrum is reported at the end of the sample time, only noise is added when pixels are actually read. In this way the fixed noise is minimized. In an instrument using the inventive method, shot noise will dominate over the whole array, and fixed noise will not be a factor. In instruments using prior art photodiode arrays, the signal-to-noise ratio of pixels with low signals is dominated by fixed noise, which may be several times greater than the shot noise.

BRIEF DESCRIPTION OF THE DRAWINGS

The foregoing and other features and advantages of the present invention will be more fully understood from the following detailed description of illustrative embodiments, taken in conjunction with the accompanying drawing in which.

DETAILED DESCRIPTION OF THE INVENTION

Detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
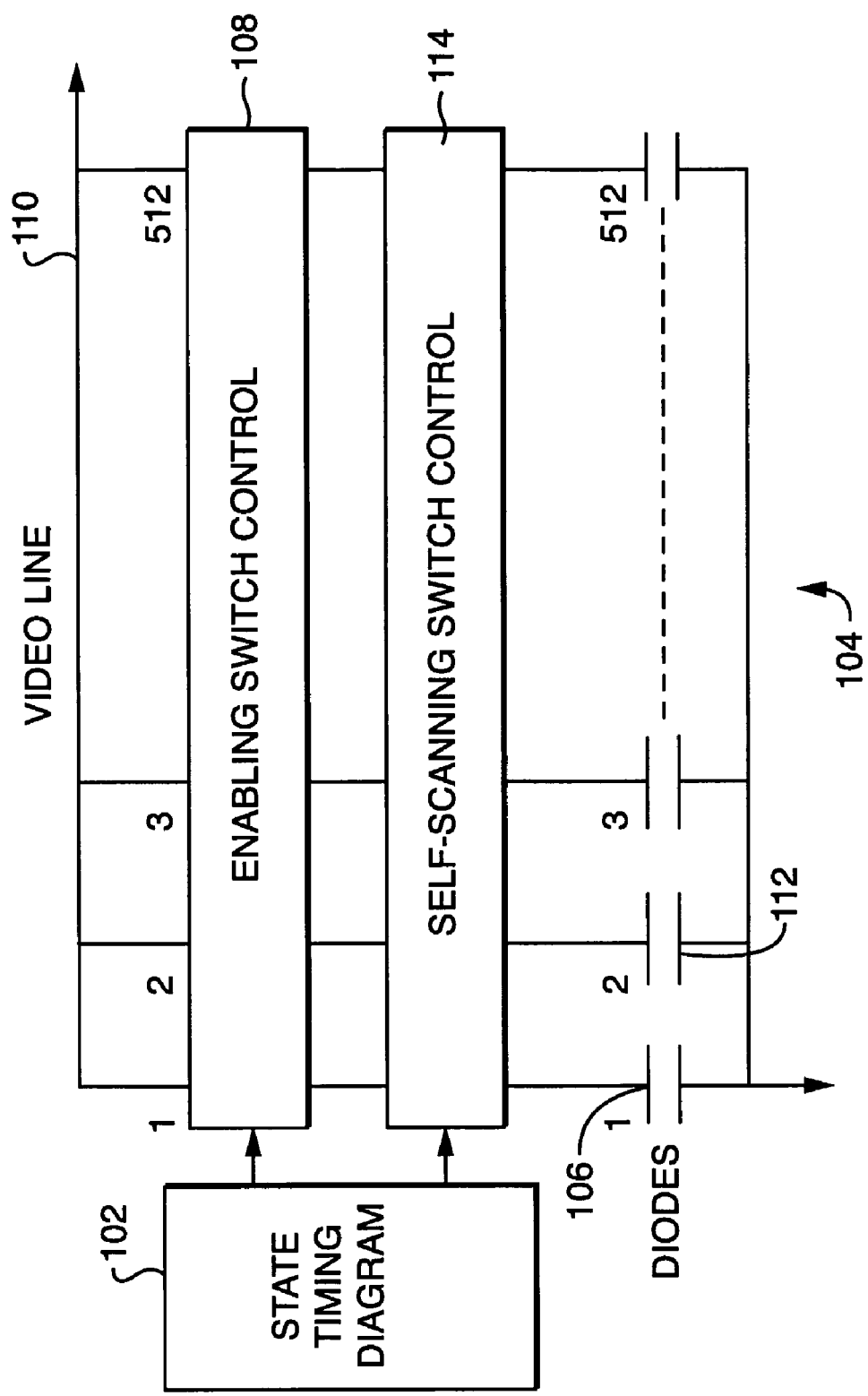
FIG. 1 is a schematic representation of a self scanning photo-diode according to the invention.

An apparatus and method in accordance with the present invention allows the use of a self scanned photo-diode array to detect light in the UV, visible and IR portions of the spectrum with greater sensitivity. Turning to FIG. 1, a block diagram depicts the device according to the invention. As shown in FIG. 1, timing information 102 is supplied in the form of electrical signals to the device. A photo diode array 104 according to the invention is comprised of individual pixels (photo-diodes). In a first illustrative embodiment the photo diode array 104 is comprised of 512 pixels that are represented by capacitors labeled 1 to 512. The photodiode array is constructed as a semiconductor device in a manner known in the art of conventional semiconductor device and photo diode array technology. It is contemplated within the scope of the invention that photo diode array technology such as implemented in a self-scanned photodiode array, part number PI 0512 WSN, available from Peripheral Imaging Corporation, San Jose, Calif., or the like may be used. The pixels within the photo diode array 104 accumulate charge at a rate in proportion to the optical power falling on them. Charge can be measured in pico coulombs, pC. The full well capacity of the pixels in this first illustrative embodiment is about 60 pC. The rate of charge accumulation can be expressed as a photocurrent in nano amps, nA.

Figure 2:
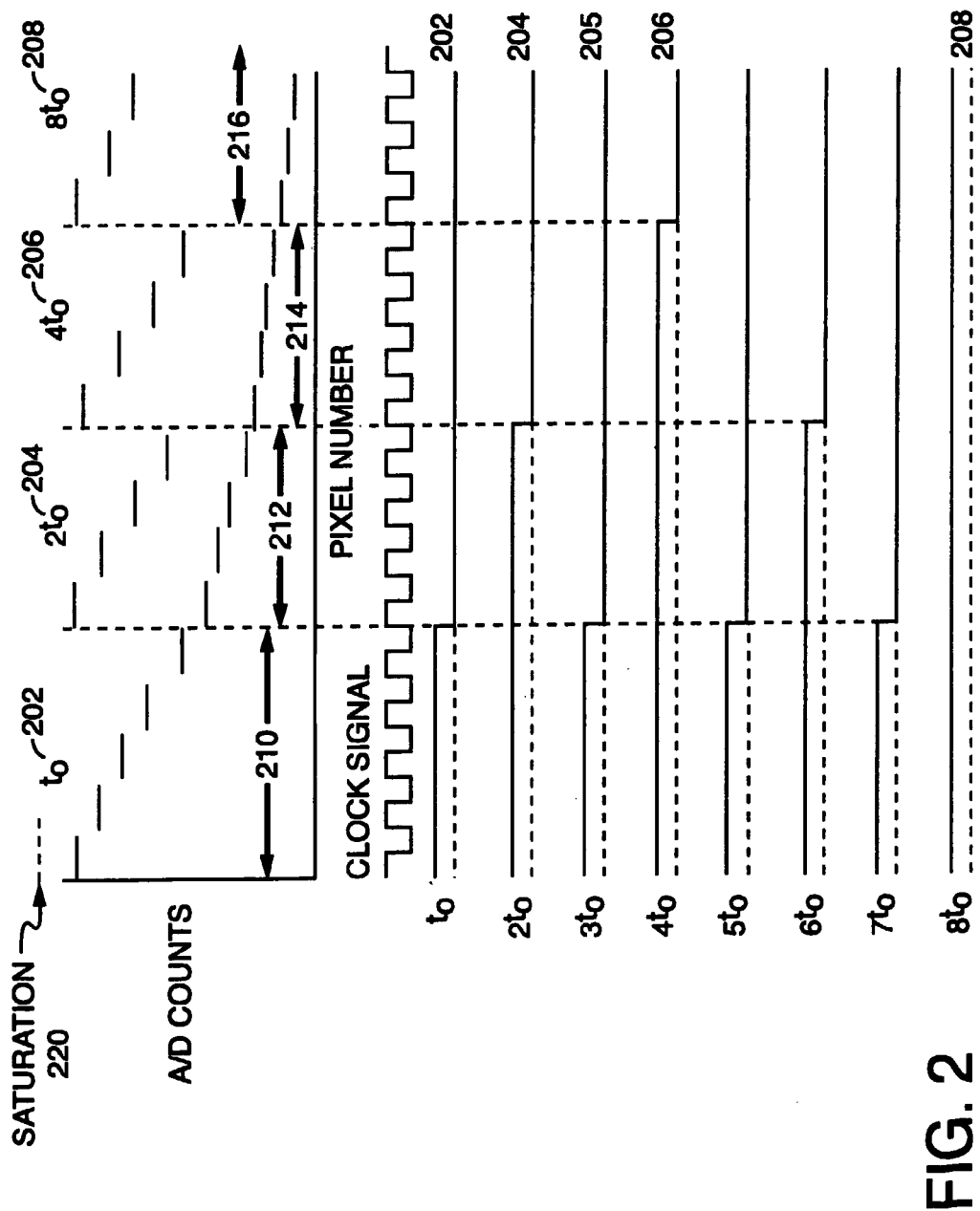
FIG. 2 is a graphic depiction of the self scanning process according to the invention that follows the clock signal until all diodes have been read.

The conventional self-scanned photo-diode array lacks an Enabling Switch Control 108, which is implemented according to the invention. The pixels are first reset, and charge accumulates according to the amount of incident light and the pixel response, which varies with wavelength. After a predetermined exposure time, a start pulse that is supplied externally initiates the self scanning process, which follows the clock signal until all pixels (photodiodes) within the photo diode array 104 have been read as depicted in FIG. 2. In this first illustrative embodiment, the next rising edge of the clock signal after the start pulse causes charge to be switched from a first pixel 106 (photo diode) to an output video line 110, where it passes to a charge amplifier, A/D converter and then to the data system. The first pixel 106 (photodiode) is reset and the next clock rising edge causes charge from second pixel 112 (photodiode) to be switched to the output video line 110. This process continues until pixels (photodiodes) within the photodiode array 104 have been read out and reset. A typical clock frequency is about 100 kHz. This frequency would cause the complete scanning process to take about 5 ms for a photodiode array 104 having 512 pixels.

As explained above, the best signal-to-noise ratio results when the exposure time is as long as possible so that the noise associated with each read cycle is minimized. In conventional devices all pixels (photodiodes) are read with the same exposure time, even if some of the pixels (photodiodes) have only accumulated a fraction of their charge capacity.

According to the invention, the Enabling Switch Control 108 is used to determine whether a particular pixel (photodiode) is read out after one exposure time $t_0$, or whether a Self-scanning Switch Control 114 signal to that pixel is blocked until its charge accumulation is optimum. That is, the enabling switch control 108 enables or disables pixel scanning as done by the self-scanning switch control 114.

In an illustrative embodiment shown in FIG. 2, a number of pixels are shown which generate photocurrent in a descending order from left to right. The timing pulses put out by the Enabling Switch Control 108 are shown below for the first 8 read cycles. In this illustrative embodiment, a high value of the enabling signal allows the self scanning process to take place and a low value prevents a pixel from being read.

Turning to FIG. 2, a first self-scanned read cycle is initiated at time $t_0$ 202, which in this illustrative embodiment is approximately 12.5 milliseconds from the start. A second read cycle is initiated at time $2t_0$ 204, which in this illustrative embodiment is approximately 25 milliseconds from the start. A third read cycle is depicted at $3t_0$ 205, and so on to the eight read cycle initiated at $8t_0$ 208, which is approximately 100 milliseconds from the start.

Pixels (photodiodes) with highest-signals 210 are read out every read cycle. The highest signal pixel 210 produces a charge close to the full well capacity, but below saturation 220. The first group of pixels 210, which includes the pixel with highest signal, produce photocurrents equal to half or more of the highest signal pixel. A second grouping of pixels are medium signal pixels 212 that produce photocurrents which are less than 50%, but more than 25% of the highest-signal pixel 210 photocurrent. These acquire more optimum charge if they are allowed to expose for two exposure cycles $2t_0$ 204, shown at the top of FIG. 2. This is accomplished by an Enabling Switch Control signal shown at time $2t_0$ 204.

The photocurrents of pixels in a third grouping are lower signal pixels 214 that produce between one quarter and one eighth of the highest-signal pixel 210, and these are read at time $4t_0$ 206. The photocurrents of pixels in a fourth grouping are lowest signal pixels 216 that produce signals below one eighth of the highest-signal pixel 210 and are read at time $8t_0$ 208. At this point all the pixels of interest have been read, and the whole sequence repeats.

Data system software accumulates the readings from each pixel to reconstruct the spectrum at the end of each $8t_0$ 208 interval. The self-scanning process produces a value every clock cycle, whether or not the switch to a particular pixel is enabled. The system software ensures that zero is recorded when a pixel is not read, so that read noise for these cycles is not added to the result.

Figure 3A:
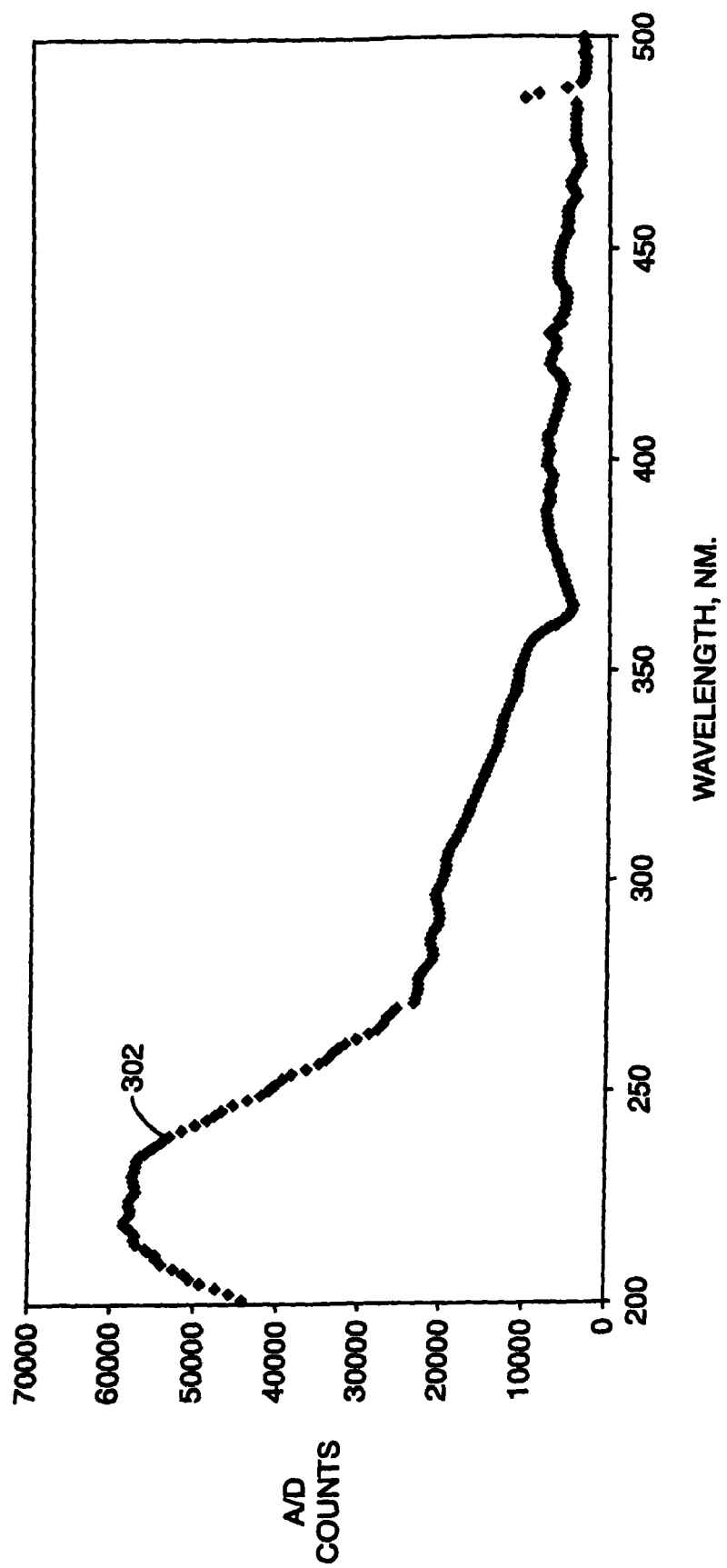
FIGS. 3A and 3B are graphic illustrations of spectra illustrating device operation.
Figure 3B:
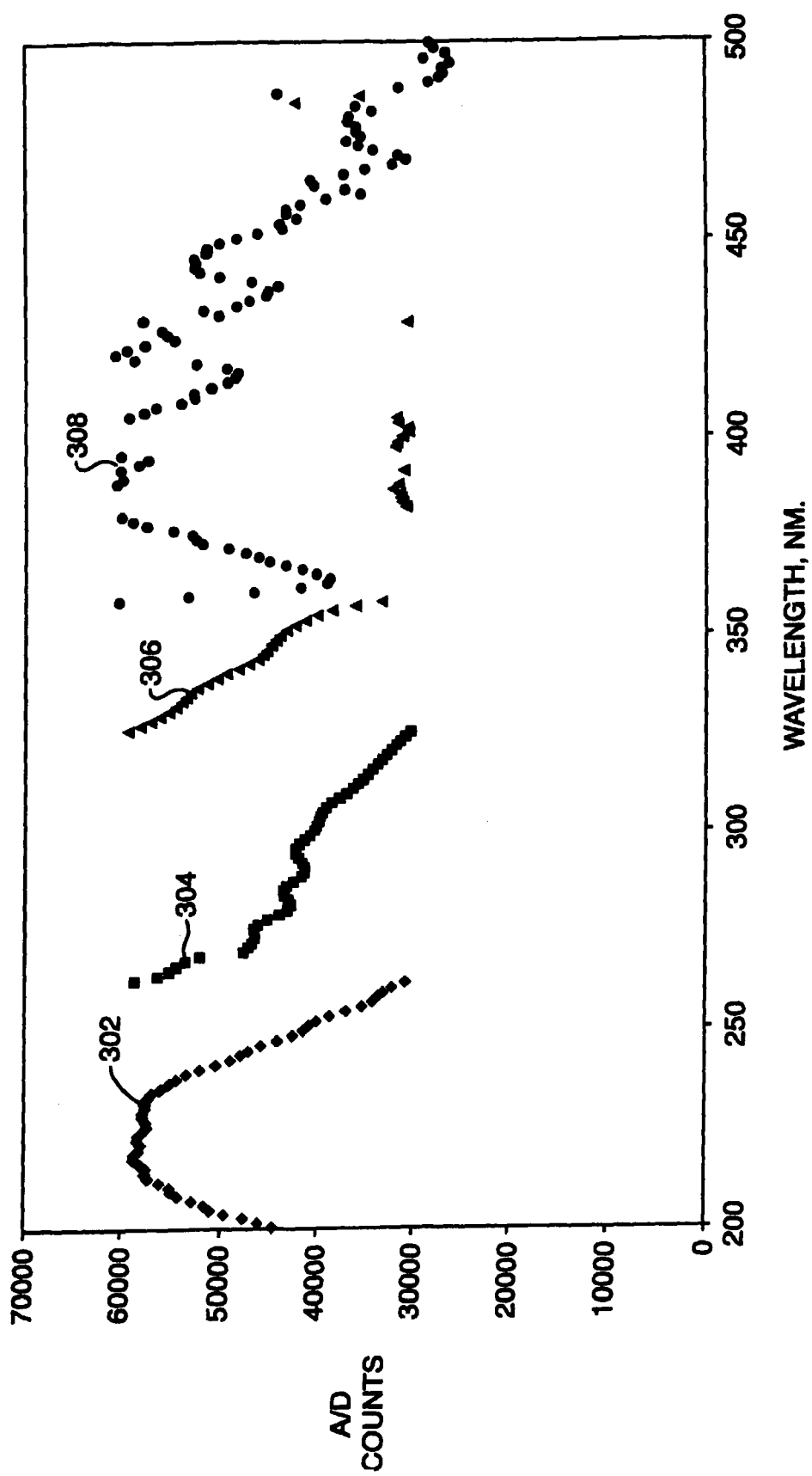

Spectra illustrating device operation according to the invention are shown in FIGS. 3A and 3B. FIG. 3A shows a portion of a deuterium arc spectrum from 200 to 500 nm, dispersed across a portion of a self-scanned photodiode array. In recording this spectrum, the Enabling Switch Control was enabled at all times. Each point on the plot is the signal from one pixel. Each pixel is read every read cycle and the result is the same as if a conventional self-scanning photodiode had been used. FIG. 3B shows pixel signals when the Enabling Switch Control is operated according to the invention as described in the context of FIG. 2. Different geometric shapes show exposure times for different pixels. As shown in FIG. 3B, an exposure time of 12.5 ms 302 is represented by diamonds; an exposure time of 25 ms 304 is represented by squares; and exposure time of 50 ms 306 is represented by triangles; and an exposure time of 100 ms 308 is represented by circles. All pixels have optimized exposure times, minimizing the number of read cycles and enhancing the signal-to-noise ratio.

Figure 4:
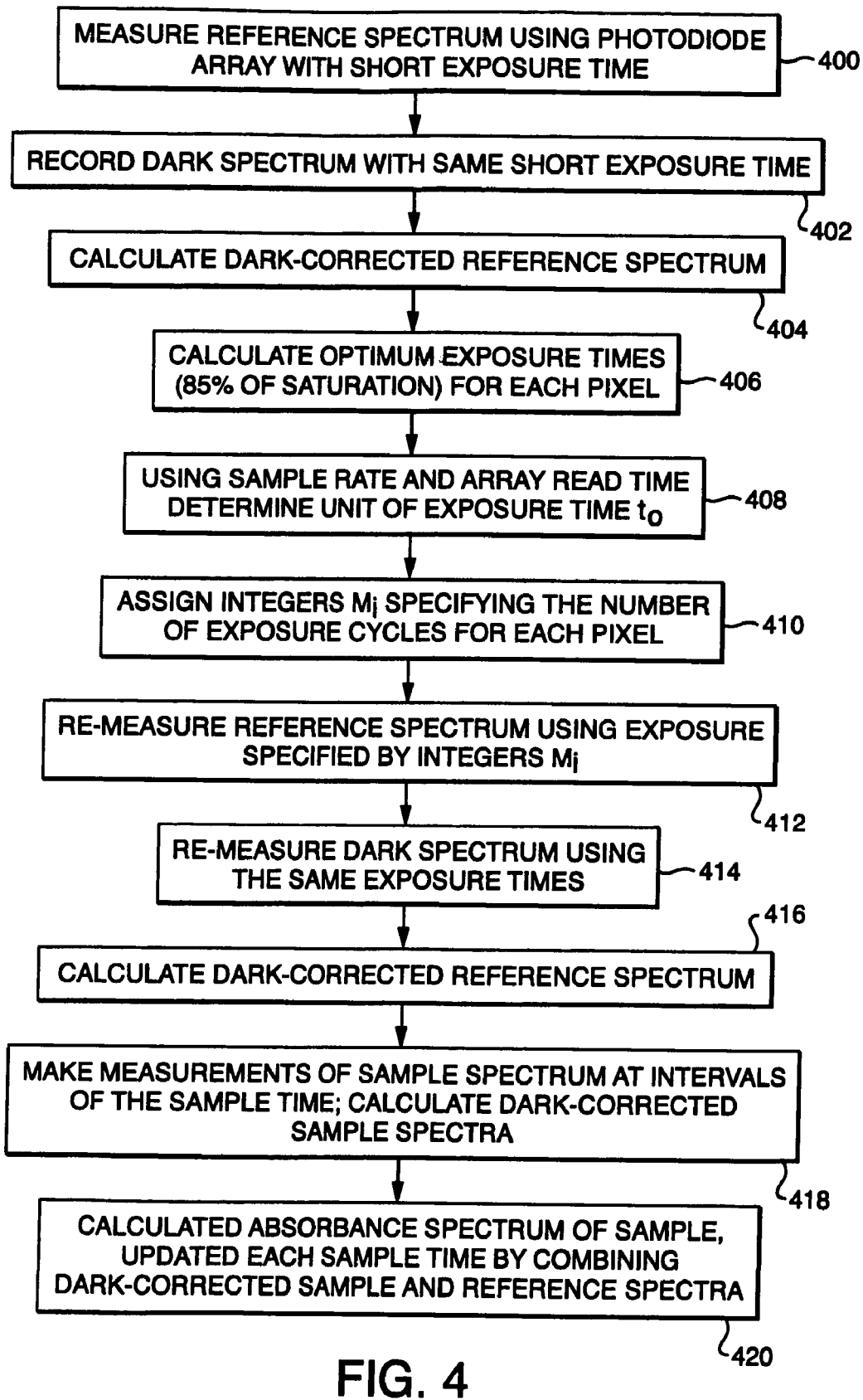
FIG. 4 is a flow diagram of a method according to the invention for improving signal to noise ratio according to the invention.

A method according to the invention for improving signal to noise ratio is depicted in FIG. 4. The method of improving signal to noise ratio of measurements is made using a self-scanned photodiode array enhanced with the addition of an Enabling Switch Control, as described hereinbefore, to detect light in the ultraviolet, visible and infrared portions of a light spectrum.

At time zero all the pixels are reset and start to accumulate charge. The pixels are exposed to light corresponding to a reference condition such as a sample cell filled with solvent, but with no analyte. All pixels are exposed to a short exposure time in which no pixels are saturated and read 400. The shutter is closed, and a dark spectrum is measured using the same short exposure time and recorded 402. The dark spectrum is subtracted and a dark-corrected reference spectrum is calculated 404. These spectra are energy spectra, plotting photocurrent measured in A/D counts versus wavelength.

Frequently, a sample rate will be specified which is related to the width in time of the analyte peaks passing through the flowcell. For example, a sample rate of 10 spectra per second means that a spectrum of the contents of the sample cell will be output every 100 ms ($T_0$). A unit of exposure time $t_0$, is selected which is longer than the time needed to read the full array, and shorter than the time for any pixel in the region of interest to saturate $t_0$ must be an integer sub-multiple of $T_0$.

According to the invention, allowed exposure times are integer multiples, $Mt_0$, of the unit of exposure time $t_0$, which are also sub-multiples of $T_0$. It is advantageous to choose a value of $t_0$ such that the maximum value of $M=T_0/t_0$ has many factors. The more allowed choices of M, the fewer read cycles overall and the more closely optimized the signal-to-noise ratio of the pixel signals.

Using the example given in FIG. 2, if $T_0$ is 100 ms, and the array can be read in less than 10 ms, a set of allowed exposure times would be 12.5, 25, 50 and 100 ms. $t_0$ is 12.5 ms, giving integer values M=1, 2, 4 and 8. Note that integers 3, 5, 6 and 7 are not allowed values of M, because they do not divide into $T_0/t_0$.

The next step is to assign values of M to every pixel in the wavelength range of interest. A dark-corrected reference spectrum is used to determine the exposure time which each pixel would need individually to reach a predetermined level such as 85% of saturation and such level is calculated 406. Using sample rate and array read time unit of exposure time $t_0$ is determined 408. The largest values of M from the above list to each pixel are assigned 410 such that the calculated exposure time needed for a given pixel to reach 85% saturation is equal to or larger than the exposure time associated with M. For example set $M_{50}=2$ if the $50^{th}$ pixel would reach 85% of saturation in 20 ms; set $M_{250}=8$ if the $250^{th}$ pixel would reach 85% of saturation in 65 ms, and so on. Depending on the range of pixel signals in a particular situation, there may be some values of M which are not assigned to any pixel.

The reference spectra is re-measured 412 using an exposure pattern specified by assigned integers $M_i$. The dark spectrum is also re-measured 414 using the exposure pattern specified by the assigned integers $M_i$. Using the re-measured spectra, specified by the assigned integers $M_i$, the dark-corrected reference spectrum is calculated 416. Sample spectra is than measured 418 using the same exposure pattern specified by the assigned integers, which is repeated each sample time $T_0$, and dark-corrected sample spectra is calculated. The reference and sample spectra are combined and the absorbance spectrum is calculated 420 as follows; A absorbance units, over the range of wavelengths of interest, by combining dark-corrected sample and reference spectra:

$$A=\log_{10}(\text{reference/sample}).$$

Although the instant invention is described using a photodiode array containing 512 individual pixels (photodiodes) it should be appreciated by those skilled in the art that the inventive method can be utilized with photodiode arrays having less or more individual pixels (photodiodes).

Although the instant invention is described using selected criteria for pixel saturation levels, it should be appreciated by those skilled in the art that variable saturation levels can be assigned to individual pixels or groups of pixels.

Various other changes, omissions and additions in the form and detail of the present invention may be made therein without departing from the spirit and scope of the invention. Therefore, the above description should not be construed as limiting, but merely as exemplification of the various embodiments.

What is claimed is:

1. A device having a self-scanned photodiode array wherein charge from individual pixels is switched from each pixel sequentially onto at least one output video line after a predetermined exposure time ($t_0$) comprising:

at least one light source;

at least one sample cell having means for receiving light from said at least one light source;

a photo-diode array having pixels for collecting light transmitted through said at least one sample cell, wherein the intensity of said light may vary across the spatial extent of the array;

means for reading said pixels;

means for skipping the reading of selected pixels for one or more additional exposure times $t_0$ allowing said selected pixels to be exposed for specified integer multiples (M) of said predetermined exposure time $t_0$, thereby allowing said selected pixels receiving less light to accumulate additional charge before being read out and thereby reducing the number of read cycles and improving the signal-to-noise ratio.

2. The self-scanned photodiode array of claim 1 wherein different pixels are exposed for the same or different integer multiples (M) of said predetermined exposure time.

3. The self-scanned photodiode array of claim 1 in which said predetermined exposure time $t_0$ does not exceed saturation of the pixel or pixels accumulating charge at a highest rate within a predetermined range of pixels.

4. The self-scanned photodiode array of claim 1 wherein specified integer multiples M are chosen such that each pixel signal, within a predetermined range of pixels approaches but does not exceed saturation.

5. The self-scanned photodiode array of claim 1 wherein said exposure time of individual pixels, $Mt_0$, does not cause saturation of pixels from which charge is measured.

6. The self-scanned photodiode array of claim 1 wherein said exposure time of each pixel, is an integer multiple M of said predetermined exposure time $t_0$, wherein the lowest value of M is greater than one.

7. The self-scanned photodiode array of claim 1 wherein a sample time is defined as a time taken for one or more complete measurements of the full or selected portion of the photodiode array, said individual pixel exposure times $Mt_0$ being submultiples of said sample time.

8. The self-scanned photodiode array of claim 1 wherein said predetermined exposure time $t_0$ is established when said photo-diode array receives said light according to a reference condition.

9. The self-scanned photodiode array of claim 3 wherein the predetermined range of pixels includes the full array.

10. The self-scanned photodiode array of claim 4 wherein the predetermined range of pixels includes the full array.

11. The self-scanned photodiode array of claim 1 wherein the value recorded when a pixel read is skipped is set to zero to avoid the addition of unnecessary read noise.

12. A method of improving signal to noise ratio of measurements made using a self-scanned photodiode array to detect light in the ultraviolet, visible and infrared portions of a light spectrum comprising the steps of:

exposing pixels of said photodiode array to light received from a reference condition and measuring the spectrum of a short exposure time causing no saturation of said pixels;

measuring a dark spectrum of said pixels with shutter closed using said short exposure time;

calculating a dark corrected reference signal from each pixel;

calculating an exposure time for each pixel such that its accumulated charge would reach a predetermined level, close to but below saturation;

establishing a predetermined exposure time $t_0$, short enough that no pixel in a specified range of interest will saturate;

assigning integers M such that individual pixels are exposed for integer multiples of the predetermined exposure time $Mt_0$, such that after time $Mt_0$ said individual pixels have accumulated charge close to but not exceeding saturation;

re-measuring dark spectrum with shutter closed using exposure pattern determined by integers;

re-measuring reference spectrum using exposure pattern determined by integers, thereby creating a dark-corrected reference spectrum;

Measuring sample spectra using the same exposure pattern determined by integers and creating dark corrected sample spectra;

combining reference and sample spectra to determine absorption characteristics of sample and thereby identify and quantitate same with improved signal-to-noise ratio.

13. A self-scanned photodiode array wherein charge from individual pixels is switched from each pixel sequentially onto at least one output video line after a predetermined exposure time ($t_0$) comprising:

an array of photodiode pixels for collecting light, wherein the intensity of said light may vary across the spatial extent of the array;

means for reading said pixels;

means for skipping the reading of selected pixels for one or more additional exposure times $t_0$ allowing said selected pixels to be exposed for specified integer multiples (M) of said predetermined exposure time $t_0$, thereby allowing said selected pixels receiving less light to accumulate additional charge before being read out and thereby reducing the number of read cycles and improving the signal-to-noise ratio of the measured light.

\* \* \* \* \*